W. K. HILL.
Feed Steamer.
No. 201,921. Patented April 2, 1878.
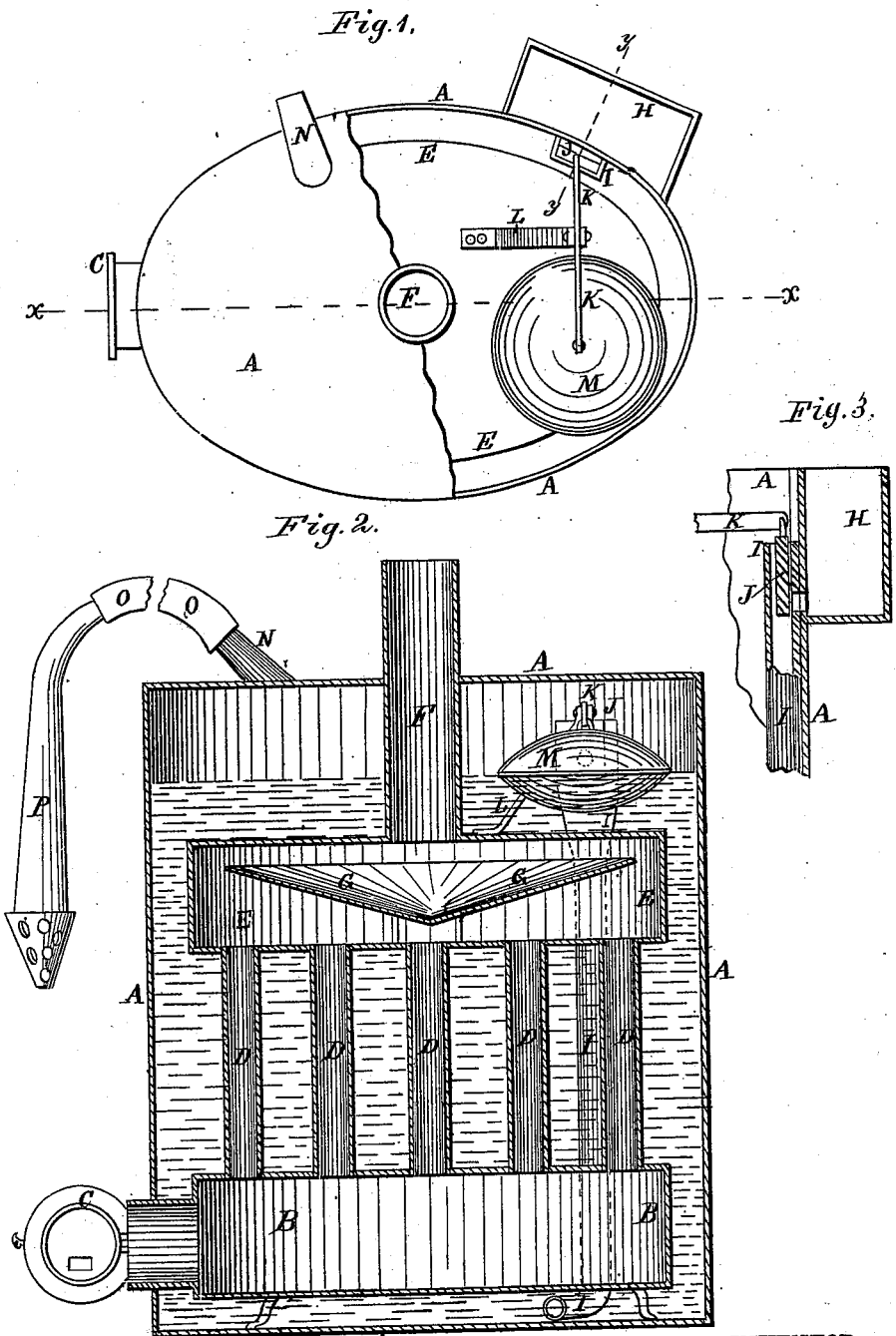
WITNESSES:
Henry N. Miller
C. Sedgwick
INVENTOR:
W. K. Hill
BY Munn & Co
ATTORNEYS.

UNITED STATES PATENT OFFICE.

WILLIAM K. HILL, OF BRUSH CREEK, IOWA.

IMPROVEMENT IN FEED-STEAMERS.

Specification forming part of Letters Patent No. 201,921, dated April 2, 1878; application filed January 29, 1878.

*To all whom it may concern:*

Be it known that I, WILLIAM K. HILL, of Brush Creek, in the county of Fayette and State of Iowa, have invented a new and useful Improvement in Feed-Steamers, of which the following is a specification:

Figure 1 is a top view of my improved apparatus, part being broken away to show the construction. Fig. 2 is a vertical section of the same, taken through the line $x$ $x$, Fig. 1. Fig. 3 is a detail sectional view taken through the line $y$ $y$, Fig. 1.

The object of my invention is to furnish an improved apparatus for cooking feed with steam, and for other uses, which shall be simple in construction, effective in operation, and convenient and economical in use.

The invention will first be described in connection with the drawing, and then pointed out in the claim.

Similar letters of reference indicate corresponding parts.

A is the water-vessel, which is made with a close top, and may be of any desired size or shape. In the lower part of the vessel A is placed the fire-chamber B, which is supported from the bottom of the said vessel A, and is made smaller than the vessel A, so that the said chamber B may be entirely surrounded with water except at one side, where it is connected with an opening in the wall of the vessel A, which is provided with a door, C, for the insertion of fuel, and to admit air to support combustion. Within the top of the fire-chamber B are connected the lower ends of a number of tubes or flues, D, which pass up through the water in the vessel A, and the upper ends of which are connected with the chamber E, into which the smoke and other heated products of combustion are introduced through the said tubes or flues D, and from which they escape through the flue F. Within the chamber E is placed a deflector, G, made in the form of a low inverted cone, against the flaring lower side of which the smoke and other heated products of combustion strike, and by which they are deflected against the sides of the chamber E, so that they may produce the greatest possible effect before they escape through the flue F. The chamber E is wholly surrounded and covered with the water in the vessel A.

To the upper part of the side of the vessel A is attached a tank, H, to contain water to supply the vessel A, so that the water may be warmed before being introduced into the said vessel A. The water from the tank H passes through an opening in the side of the vessel, and into a pipe, I, which passes down along the inner surface of the said side and discharges the water beneath the bottom of the fire-chamber B. The inlet-opening from the tank H is closed with a sliding valve, J, which is pivoted to the end of the lever K. The lever K is pivoted to a support, L, attached to the top of the heating-chamber E, and to its other end is pivoted a float, M, which floats upon the surface of the water in the vessel A. With this construction, should the water sink below the water-line, the float M will sink with it, and the movement of the lever K thus caused will raise the valve J and admit water from the tank H. As the water in the vessel A again rises to the water-line, the upward movement of the float M again operates the lever K and closes the valve J, shutting off the water. The vessel A is thus kept filled to the water-line automatically.

In a hole in the top of the vessel A is secured a short pipe, N, to which is secured the end of a flexible pipe, O, which may be of any desired length, and to the other end of which is attached a nozzle, P. The nozzle P is made with a perforated head, to allow the steam to escape freely into the substance to be cooked or heated. The head of the nozzle P is made conical, so that it may be readily forced into the substance to be cooked or heated.

Having thus fully described my invention, I claim as new and desire to secure by Letters Patent—

The combination of the sliding valve J, the pivoted lever K, and the float M with the feed-water tank H, having pipe I extended to the bottom of the vessel A, and curved so as to deliver under the bottom of the heater B D E, whereby the opening between the tank and the vessel may be automatically closed and opened, as specified.

WILLIAM KING HILL.

Witnesses:
SAMUEL McCORD,
F. GLIME.